(12) United States Patent
Orosa

(10) Patent No.: US 9,897,413 B1
(45) Date of Patent: Feb. 20, 2018

(54) PROCESS FOR LAUNCHING A CRUISE MISSILE FROM AN AIRCRAFT

(71) Applicant: John A Orosa, Palm Beach Gardens, FL (US)

(72) Inventor: John A Orosa, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/216,966

(22) Filed: Jul. 22, 2016

(51) Int. Cl.
*F41F 3/055* (2006.01)
*F41H 3/00* (2006.01)
*B64D 1/06* (2006.01)
*B64D 3/00* (2006.01)

(52) U.S. Cl.
CPC ............... *F41F 3/055* (2013.01); *B64D 1/06* (2013.01); *B64D 3/00* (2013.01); *F41H 3/00* (2013.01)

(58) Field of Classification Search
CPC ... F41H 3/00; F41F 3/055; B64D 1/06; B64D 3/00
USPC ............. 89/1.811, 1.819, 1.8, 1.801, 1.6
See application file for complete search history.

(56) References Cited

U.S. PATENT DOCUMENTS

| | | | | |
|---|---|---|---|---|
| 2,977,853 A | * | 4/1961 | Gehrkens | B64D 1/04 244/135 R |
| 3,158,060 A | * | 11/1964 | Semenoff | F41F 3/055 200/506 |
| 3,644,938 A | * | 2/1972 | Slate | F41F 3/055 439/188 |
| 3,712,169 A | * | 1/1973 | Koff | B64D 1/06 102/396 |
| 4,322,998 A | * | 4/1982 | Fowler | F42C 17/04 89/1.55 |
| 4,478,127 A | * | 10/1984 | Hennings | B64D 1/04 102/225 |
| 5,040,744 A | * | 8/1991 | LeCompte | F42B 15/04 244/3.12 |
| 5,042,390 A | * | 8/1991 | Schotter | F41F 3/055 102/504 |
| 5,497,156 A | * | 3/1996 | Bushman | B64D 3/00 244/1 TD |
| 5,522,566 A | * | 6/1996 | Hardy | B64C 1/0009 244/130 |
| 5,626,310 A | * | 5/1997 | Kelly | B64C 25/08 244/171.4 |
| 5,710,388 A | * | 1/1998 | Hutchinson | F41F 3/055 439/660 |
| 5,717,397 A | * | 2/1998 | Ruszkowski, Jr. | B64D 7/00 342/2 |

(Continued)

OTHER PUBLICATIONS

John Reed, The J-20 Stealth Fighters Weapons Bays, Jul. 6, 2011, Defense Tech, pp. 1-5.*

(Continued)

*Primary Examiner* — Michelle Clement
*Assistant Examiner* — Bridget A Cochran
(74) *Attorney, Agent, or Firm* — John Ryznic

(57) ABSTRACT

A process for starting an engine in a cruise missile that is launched from an aircraft during flight, where the cruise missile is ejected from a weapons bay of the aircraft and towed using a tow line, where the cruise missile engine is started while being towed and then released after the engine has started. The tow line is a low radar signature line and the weapons bay door is closed quickly after the cruise missile has been ejected to reduce radar signatures.

8 Claims, 1 Drawing Sheet

(56) References Cited

U.S. PATENT DOCUMENTS

| | | | | |
|---|---|---|---|---|
| 6,055,909 | A * | 5/2000 | Sweeny | F41J 2/02 102/336 |
| 6,058,846 | A * | 5/2000 | Boyd | F02C 7/042 102/374 |
| 6,347,567 | B1 * | 2/2002 | Eckstein | B64D 1/04 89/1.59 |
| 6,604,711 | B1 * | 8/2003 | Stevens | B64C 39/024 244/135 A |
| 6,738,007 | B1 * | 5/2004 | Stafford | B63G 13/02 342/3 |
| 6,886,773 | B2 * | 5/2005 | Peckham | B64D 3/02 244/1 TD |
| 8,353,238 | B1 * | 1/2013 | Montgomery | F41F 3/065 89/1.811 |
| 8,727,264 | B1 * | 5/2014 | Rutan | B64D 3/00 244/158.1 |
| 2003/0136874 | A1 * | 7/2003 | Gjerdrum | B64D 39/00 244/10 |
| 2005/0183570 | A1 * | 8/2005 | McMahon | F41G 7/007 89/1.811 |
| 2010/0217899 | A1 * | 8/2010 | Sitzmann | F41F 3/055 710/69 |
| 2011/0057070 | A1 * | 3/2011 | Lance | F41F 1/00 244/3.12 |
| 2011/0174917 | A1 * | 7/2011 | Dold | F41G 7/007 244/3.15 |
| 2012/0037749 | A1 * | 2/2012 | Lance | F41F 1/00 244/3.12 |

OTHER PUBLICATIONS

John Reed, The J-20 Stealth Fighters Weapons Bays, Jul. 6, 2011, Defense Tech, pp. 1-5 (Year: 2011).*

* cited by examiner

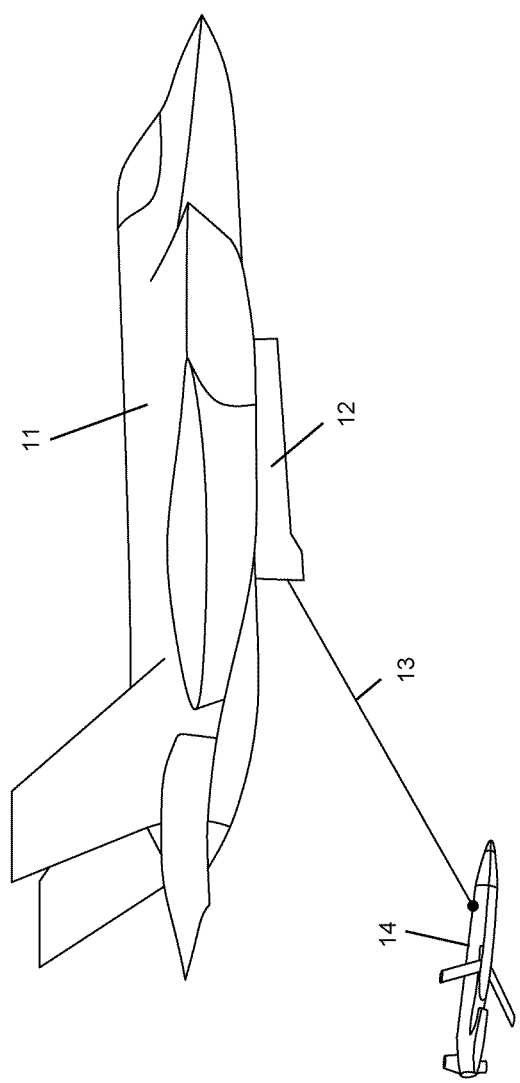

PROCESS FOR LAUNCHING A CRUISE MISSILE FROM AN AIRCRAFT

CROSS-REFERENCE TO RELATED APPLICATIONS

None.

GOVERNMENT LICENSE RIGHTS

None.

BACKGROUND OF THE INVENTION

Field of the Invention

The present invention relates generally to a cruise missile and more specifically to a process to start a gas turbine engine in a cruise missile launched from an aircraft in flight.

Description of the Related Art Including Information Disclosed Under 37 CFR 1.97 and 1.98

A cruise missile powered by a small gas turbine engine is carried within an aircraft weapons bay enclosed by weapons bay doors. To launch the cruise missile, the weapons bay doors are opened and the cruise missile is ejected outside and into the air stream. The speed of the cruise missile in the airstream is fast enough to air start the gas turbine engine of the cruise missile. However, the cruise missile has dropped in altitude a considerable amount, and once the engine starts the cruise missile must burn fuel to climb back to the altitude from which the cruise missile was released from the aircraft. This burns precious fuel and thus decreases the range and or loiter time for the cruise missile. The cruise missile could minimize altitude loss by using a pyrotechnic device to quickly accelerate and start the engine, but this adds weight, cost and still incurs speed and altitude loss.

The cruise missile could be attached to a mechanism within the weapons bay of the aircraft that will extend the cruise missile out from the weapons bay and into the airstream, but this mechanism would not be hidden from radar. Also, extending this mechanism outward from the weapons bay would require that the weapons bay doors be open for a considerable amount of time. The weapons bay doors would also be seen by radar.

BRIEF SUMMARY OF THE INVENTION

A stealth cruise missile carried within a weapons bay of a stealth aircraft would be ejected from the weapons bay and towed momentarily in the airstream using a radar absorbent material (RAM) tow line that will tow the cruise missile until a gas turbine or ram jet engine accelerates and can be started. Once the cruise missile is ejected from the weapons bay, the weapons bay doors can be quickly closed in order to reduce a radar signature from the open doors and weapons bay and maintain the stealth capability of the aircraft and the cruise missile. After the cruise missile engine has been started the cruise missile releases the tow line and flies away to complete its mission. The tow line can then be retracted into the weapons bay with the doors closed through a slit or hole or discarded altogether.

BRIEF DESCRIPTION OF THE SEVERAL VIEWS OF THE DRAWINGS

FIG. 1 shows a stealth aircraft with a weapons bay doors open and a cruise missile being towed using a RAM tow line.

DETAILED DESCRIPTION OF THE INVENTION

The present invention is an apparatus and a process for launching a stealth cruise missile from a stealth aircraft while maintaining stealth capability by limiting exposure to a radar. FIG. 1 shows a stealth aircraft 11 with a weapons bay having doors 12 in an open position. A stealth cruise missile 14 is carried within the weapons bay and ejected into the airstream during flight of the aircraft. The cruise missile 14 is towed by the aircraft 11 using a RAM (radar absorbent material) tow line 13 that is made of or coated with radar absorbent material. The aircraft 11 tows the cruise missile 14 until a gas turbine engine (or a ram jet engine) in the cruise missile 14 can be started. Once the cruise missile can fly on its own, the RAM tow line 13 is released from the cruise missile and the cruise missile flies away on its own power.

When the stealth aircraft 11 is to launch a cruise missile, the weapons bay doors 12 are opened and the cruise missile connected to the tow line 13 is ejected from the weapons bay. After the cruise missile 14 has dropped below the open doors 14, the doors 14 are quickly closed to maintain stealth capability. After the cruise missile 14 is released from the tow line 13, the tow line 13 is retracted into the weapons bay while the doors are closed or the tow line can be discarded into the free stream. A small opening on one or both edges of the doors 12 can be used to allow for the doors 12 to close while still towing the cruise missile 14.

I claim the following:

1. A process for starting a gas turbine engine in a cruise missile from an aircraft in flight comprising the steps of: securing a cruise missile within a weapons bay of an aircraft; ejecting the cruise missile from the weapons bay of the aircraft during flight; towing the cruise missile with a tow line from the aircraft during flight; starting the gas turbine engine of the cruise missile while being towed by the aircraft; and, releasing the cruise missile from the tow line after the gas turbine engine has started.

2. The process for starting a gas turbine engine in a cruise missile of claim 1, and further comprising the step of: after the cruise missile has been ejected from the weapons bay, closing the weapons bay door so as to reduce any radar signature.

3. The process for starting a gas turbine engine in a cruise missile of claim 1, and further comprising the step of: using a tow line with a radar absorbent material.

4. The process for starting a gas turbine engine in a cruise missile of claim 1, and further comprising the step of: using an opening in a weapons bay door so that the tow line can extend out from the weapons bay door while the weapons bay door is closed.

5. The process for starting a gas turbine engine in a cruise missile of claim 1, and further comprising the step of: reeling in the tow line after the cruise missile has been released.

6. The process for starting a gas turbine engine in a cruise missile of claim 1, and further comprising the step of: the tow line is released from the weapons bay after the cruise missile has been released from the tow line.

7. The process for starting a gas turbine engine in a cruise missile of claim 1, and further comprising the step of: using a stealth aircraft as the aircraft that releases the cruise missile to reduce a radar signature.

8. The process for starting a gas turbine engine in a cruise missile of claim 1, and further comprising the step of: using a stealth aircraft and a stealth cruise missile to reduce a radar signature.

\* \* \* \* \*